United States Patent
Cronin et al.

(10) Patent No.: US 9,596,915 B1
(45) Date of Patent: Mar. 21, 2017

(54) SPORTS FAN COOLER ATTACHMENT FOR TAILGATING PURPOSES

(71) Applicant: ProSports Technologies, LLC, Miami, FL (US)

(72) Inventors: John E. Cronin, Bonita Springs, FL (US); Nick Reasner, Chicago, IL (US)

(73) Assignee: PROSPORTS TECHNOLOGIES, LLC, Miami, FL (US)

( * ) Notice: Subject to any disclaimer, the term of this patent is extended or adjusted under 35 U.S.C. 154(b) by 0 days.

(21) Appl. No.: 14/798,170

(22) Filed: Jul. 13, 2015

Related U.S. Application Data

(60) Provisional application No. 62/023,610, filed on Jul. 11, 2014.

(51) Int. Cl.
| | |
|---|---|
| F25D 3/08 | (2006.01) |
| A45C 11/20 | (2006.01) |
| A45C 13/00 | (2006.01) |
| H02J 7/00 | (2006.01) |
| A45C 11/00 | (2006.01) |

(52) U.S. Cl.
CPC ............ *A45C 11/20* (2013.01); *A45C 13/001* (2013.01); *H02J 7/0042* (2013.01); *H02J 7/0054* (2013.01); *A45C 2011/002* (2013.01)

(58) Field of Classification Search
CPC . F25D 3/08; F25D 2331/804; F25D 2331/905
USPC ........................... 62/457.1, 457.5, 371, 457.7
See application file for complete search history.

(56) References Cited

U.S. PATENT DOCUMENTS

| | | |
|---|---|---|
| 3,005,282 A | 10/1961 | Kirk |
| 3,081,897 A | 3/1963 | Leroy |
| 3,093,259 A | 6/1963 | Morrison |
| 3,160,307 A | 12/1964 | Morrison |
| 3,331,613 A | 7/1967 | Popelka |
| 3,374,914 A | 3/1968 | Adam |
| 3,410,441 A | 11/1968 | Rhyne |
| 3,448,775 A | 6/1969 | Foglia |
| 3,877,602 A | 4/1975 | Clark et al. |
| 4,492,153 A | 1/1985 | Grabowski |
| 4,561,554 A | 12/1985 | Swincicki |
| 4,679,242 A | 7/1987 | Brockhaus |
| 4,796,909 A | 1/1989 | Kirkendall |
| 5,080,387 A | 1/1992 | Ryals |
| 5,100,198 A * | 3/1992 | Baltzell ............... A47C 7/74 280/30 |
| 5,169,164 A | 12/1992 | Bradford |

(Continued)

OTHER PUBLICATIONS

"60-Can Collapsible Wheeled Cooler", Coleman, Jun. 9, 2014.

(Continued)

*Primary Examiner* — Melvin Jones
(74) *Attorney, Agent, or Firm* — Polsinelli LLP

(57) ABSTRACT

A cooler capable of incorporating a variety of different attachments used for tailgate parties is described. The cooler is capable of being affixed with various decorations and additional features through the use of attachments associated with the cooler. The attachments allow the decorations and features to stay attached thereby facilitating transportation of the entirety of the cooler and affixed items from one location to the location of the tailgate party. The cooler also includes the ability to power one or more electronic devices through the use of a battery supply that can be connected to the cooler.

13 Claims, 3 Drawing Sheets

(56) References Cited

U.S. PATENT DOCUMENTS

| | | |
|---|---|---|
| 5,236,099 A | 8/1993 | Fties et al. |
| 5,249,823 A | 10/1993 | McCoy et al. |
| 5,285,656 A | 2/1994 | Peters |
| 5,299,817 A | 4/1994 | Chang |
| 5,313,817 A | 5/1994 | Meinders |
| 5,328,192 A | 7/1994 | Thompson |
| D358,921 S | 5/1995 | Abbema |
| 5,413,236 A | 5/1995 | Kenevan |
| 5,465,996 A | 11/1995 | Wisz |
| 5,597,084 A | 1/1997 | Parasin |
| 5,599,031 A | 2/1997 | Hodges |
| 5,622,276 A | 4/1997 | Simmons |
| 5,779,252 A | 7/1998 | Bolton |
| 5,797,508 A | 8/1998 | Loftus |
| 5,826,893 A | 10/1998 | Snoeyenbos |
| 6,016,933 A | 1/2000 | Daily et al. |
| 6,024,223 A | 2/2000 | Ritter |
| 6,109,625 A | 8/2000 | Hewitt |
| 6,109,644 A | 8/2000 | Cox |
| 6,488,304 B2 | 12/2002 | Krawczyk |
| 6,783,147 B1 | 8/2004 | Green |
| 6,966,449 B2 | 11/2005 | Williams |
| 7,055,642 B1 | 6/2006 | Chambers et al. |
| 7,147,125 B1 | 12/2006 | Slovak et al. |
| 7,188,491 B2 * | 3/2007 | Donald, II ............... B62B 3/00 348/E5.128 |
| 7,407,032 B1 | 8/2008 | Chambers et al. |
| 7,478,734 B2 | 1/2009 | Vargas |
| D600,873 S | 9/2009 | Banasik et al. |
| D611,219 S | 3/2010 | Banasik et al. |
| 7,909,000 B1 | 3/2011 | O'Neill et al. |
| 9,278,802 B2 | 3/2016 | Huang et al. |
| 2003/0155748 A1 | 8/2003 | Picard et al. |
| 2003/0183544 A1 | 10/2003 | Lawrence |
| 2004/0124191 A1 | 7/2004 | Colladon |
| 2004/0173610 A1 | 9/2004 | Gregorio Gracia |
| 2007/0137222 A1 | 6/2007 | Kastanek et al. |
| 2007/0145051 A1 | 6/2007 | Uffner |
| 2008/0209776 A1 * | 9/2008 | Suprina ............... G09F 7/06 40/1 |
| 2010/0126196 A1 | 5/2010 | McCance |
| 2013/0146606 A1 | 6/2013 | Blay et al. |
| 2013/0193673 A1 | 8/2013 | Vanderberg et al. |
| 2014/0326719 A1 | 11/2014 | Huang et al. |
| 2015/0048082 A1 | 2/2015 | Glalal et al. |
| 2015/0239605 A1 | 8/2015 | Campos |

OTHER PUBLICATIONS

"Flip Box—Collapsible Iceless Cooler: Sports & Outdoors", Amazon.com, Jun. 9, 2014.
"Flip-box Folding Esky Box", Garillia.com.au, Jun. 9, 2014.
"Mac Sports Collapsible Red Wagon with Cooler", Blain's Farm & Fleet, Jun. 3, 2014.
"Staples Expanding Folding Crate on Wheels", Staples, Jun. 3, 2014.
U.S. Appl. No. 14/798,279 Office Action mailed Nov. 4, 2015.
U.S. Appl. No. 14/798,279, John E. Cronin, Portable Cooler, Jul. 13, 2015.
U.S. Appl. No. 14/798,341, John E. Cronin, Configurable Cooler Carrier, Jul. 13, 2015.
U.S. Appl. No. 14/798,341 Office Action mailed Nov. 18, 2015.
U.S. Appl. No. 14/798,279 Office Action mailed Mar. 28, 2016.
U.S. Appl. No. 14/798,341 Final Office Action mailed Mar. 17, 2016.

* cited by examiner

Basic Attachments ent application claims the priority benefit of U.S.
SPORTS FAN COOLER ATTACHMENT FOR TAILGATING PURPOSES

CROSS-REFERENCE TO RELATED APPLICATIONS

The present application claims the priority benefit of U.S. provisional application No. 62/023,610 filed Jul. 11, 2014 and entitled "Sports Fan Cooler Attachment for Tailgating Purposes," the disclosure of which is incorporated herein by reference.

BACKGROUND OF THE INVENTION

Field of Invention

The present invention generally relates to coolers. More specifically, the present invention relates to coolers that can be associated with other objects and devices to be used for tailgating parties.

Description of the Related Art

Tailgate parties are generally social events held on or around an open tailgate of a vehicle (i.e., the trunk of a car). Tailgate parties can be held, for example, in the parking lots at stadiums and arenas before and after sporting events and concerts. During tailgate parties, people many times will eat and drink. The food can be brought along and prepared on-site (e.g., barbecue via a portable grill). For example, popular foods that may be prepared for a tailgate party includes hamburgers, hotdogs and cold salads. These food items may be stored in a cooler during transportation to the tailgate party site as well as while the food is not being eaten or prepared.

Tailgate parties have been seen as a way for people to spread pre-game festivities at sporting events including football, basketball, hockey, soccer and baseball. Based on individual fans, people may also express their excitement during pre-game festivities, for example, by wearing sport-related memorabilia.

There is currently no available way to allow a fan to decorate or customize a cooler for purposes of spreading pre-game excitement during tailgating. There is a need to facilitate not only promotion of pre-game festivities via decorating of the cooler with fan-based memorabilia but also to ensure that the cooler can be compatible with other desired items (e.g., electronics). There is a need to also ensure that transportation and use of the cooler is not negatively impacted with the addition of, for example, the fan-based memorabilia or other desired items.

SUMMARY OF THE CLAIMED INVENTION

A cooler for tailgating parties is presently claimed. The cooler includes a plurality of attachment structures on outer surfaces of the cooler used for affixing one or more additional features to the cooler. The cooler may also include a battery supply affixed to the cooler. The battery supply can be used to provide power to electronic devices via embedded wiring and electronics associated with the cooler.

DETAILED DESCRIPTION

A cooler usable during tailgate parties is described herein. The cooler is designed to allow people to attach/associate various numbers of memorabilia and electronic items (e.g., lights, radios) with the cooler. The addition of memorabilia and electronic items to the cooler promotes pre-game festivities at sporting events and facilitates carrying out the tailgate party.

The cooler accomplishes the addition of the various memorabilia and electronic items that people can add/associate with the cooler via male-female snap-based attachments. The cooler can also be incorporated with a power supply and power connecting units used to supply power to electronics associated with the cooler.

Figure 1:
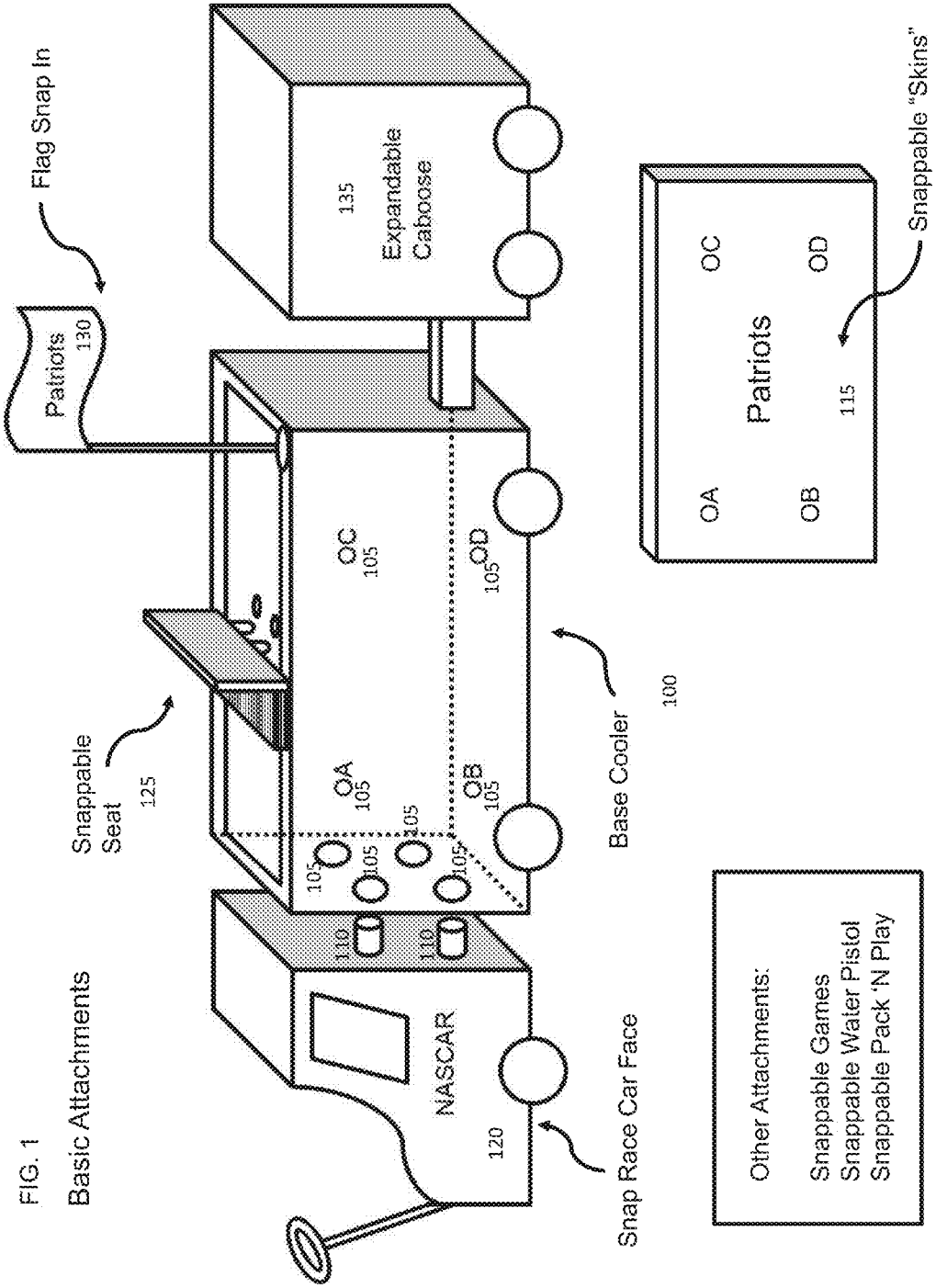
FIG. 1 illustrates a cooler with exemplary memorabilia for use during a tailgate party.

FIG. 1 illustrates a cooler 100 with exemplary memorabilia for use during a tailgate party. In particular, the cooler 100 includes some basic attachments that can be incorporated via the male-female snap-based attachments. The memorabilia (e.g., team flag, sport-based decorations) have been added to the cooler to promote pre-game festivities. There may also include other attachments (e.g., electronics, chairs) that can also be associated with the cooler 100 that are also usable during the tailgate party. The cooler 100 and corresponding decoration 120 and/or expanded caboose 135 may include wheels to facilitate transportation by the owner (e.g., pushing/pulling the cooler 100). Further details regarding the cooler 100 and the various attachments will be provided below.

As illustrated in FIG. 1, the present invention is directed towards the cooler 100 having a plurality of snap-based attachments for associating, for example, memorabilia. The cooler 100 itself may have many characteristics of coolers that are currently available on the market. For example, the cooler 100 is used to transport food and drinks from one location to the location of the tailgate party. The food and drinks can be kept cool through the insulation provided by the cooler 100. In some embodiments, the cooler 100 may utilize ice or fans to facilitate keeping the food and drinks cool while stored inside the cooler 100.

Distinct from other coolers available on the market, however, the cooler 100 described herein may include a plurality of holes 105 that can be used to implement male-female snap-based attachments. The holes 105 allow additional items (e.g., skins 115, decorations 120, and memorabilia) to be attached to the cooler 100. These additional items may be placed within the holes 105 directly (e.g., flag 130). In some embodiments, the additional items may have one or more posts 110 that may be used to interact with the holes 105.

An example of how the holes 105 and posts 110 are used to attach the additional items to the cooler 110 can be seen with respect to the snap race car face decoration 120. As illustrated with the decoration 120 of FIG. 1, the decoration 120 has a plurality of posts 110 that are aligned with the holes 105 of the cooler 100. The posts 110 interact with corresponding holes 105 so that the decoration 120 can be affixed to the cooler 100.

It should be noted that the posts 110 and/or the holes 105 may include a feature, such as a lock-based mechanism, (not shown) that allows the two components of the male-female snap-based attachment to stay in connection with each other. The feature can prevent the unintentional/premature disengagement of the additional feature from the cooler 100. The feature can allow the user of the cooler 100 to dictate when the additional times can be removed via, for example, a release feature associated with the posts 100 and/or holes 105. It should be noted that other means of attaching additional items may also be possible. For example, adhesive-based (e.g., glue) and mechanical-based (e.g., Velcro) methods can also be used to affix the additional items to the cooler 100.

The cooler 100 of FIG. 1 may be associated with a variety of different items that can be used to decorate or provide additional utility to the cooler 100. As illustrated, the cooler 100 may include skins 115, decorations 120 or memorabilia (e.g., flag 130) that can be used to decorate the cooler 100. These items used to decorate the cooler 100 may be attached to the cooler 100 to promote, for example, pre-game festivities and excitement for a particular team or sport. For example, the skin 115 and the flag 130 of FIG. 1 may display a particular sport team that the owner wishes to cheer for (e.g., the Patriots). The skin 115 and the flag 130 may be customizable based on a particular sport, team or professional athlete the owner wishes to cheer for or is interested in.

The cooler 100 may also be capable of attaching various decorations 120. Similar to the skins 115 and memorabilia, the decoration 120 can also be used to display interest of the owner, for example, towards a particular sport, team or professional athlete. As illustrated in FIG. 1, the decoration 120 is a race car face. This may be used to display that the owner is interested in professional racing by making the cooler 100 look more like a race car used in the professional races. Much like the skins 115 and memorabilia, the decoration 120 used can also be customized based on a particular sport, team or professional athlete the owner is interested in. In some embodiments, the decoration 120 may also be non-sport related (e.g., animals, spaceship). The decorations 120 in this case may intend to provide a means for decorating the cooler 100 to make it look more appealing, for example, for kids.

The cooler 100 may also provide additional utility through the addition of various apparatus like a seat 125. During tailgate parties, there may not be enough seating for everyone who is participating. Additional seats 125 may be affixed to the cooler 100 so that one or more people can have a place to sit if needed. The seats 125 may also be used, for example, in conjunction with the decorations 120 to create a vehicle (e.g., car, spaceship) that kids can sit in and interact with to keep them occupied during the tailgate party. The seat 125 is affixed to the top of the cooler 100 through posts associated with the seat 125 coming in contact with corresponding holes 105 of the cooler 100. With the male-female snap-based attachment, this can ensure that the seat 125 remains fixed and stationary on the cooler 100.

It should be noted that other items besides a seat 125 can attached to the top of the cooler 100. In fact, various different items can also be attached to the cooler 100 on various parts of the cooler 100 apart from what has been already been described above. These other items may include, for example, electronics (as described below in FIG. 2), which may also be used during the tailgate party. As listed in FIG. 1, other attachments may also include games, water-based toys and play pens (not shown). These other attachments may be affixed to the cooler 100 during transportation and later detached for use. In this way, the male-female snap-based attachments of the cooler 100 can facilitate transportation of various items as well.

With reference to FIG. 1, the cooler 100 may also have an expandable caboose 135. The expandable caboose 135 may be used to contain other items that would not fit within the cooler 100 or are chosen to be stored separately from items stored in the cooler 100. For example, the expandable caboose 135 may be used to store utensils, napkins, paper plates or any other item that may not require refrigeration. These items stored in the expandable caboose 135 may also be desired at the tailgate party. The expandable caboose 135 provides an efficient way for the owner to store and transport additional items for use at the tailgate party.

The expandable caboose 135 may be attached to the cooler 100 using similar male-female snap-based attachments facilitated through holes 105 and posts 110. It may be possible that the expandable caboose 135 is attached to the cooler 100 using some other mechanical-adhesive or adhesive-based method as described above.

Figure 2:
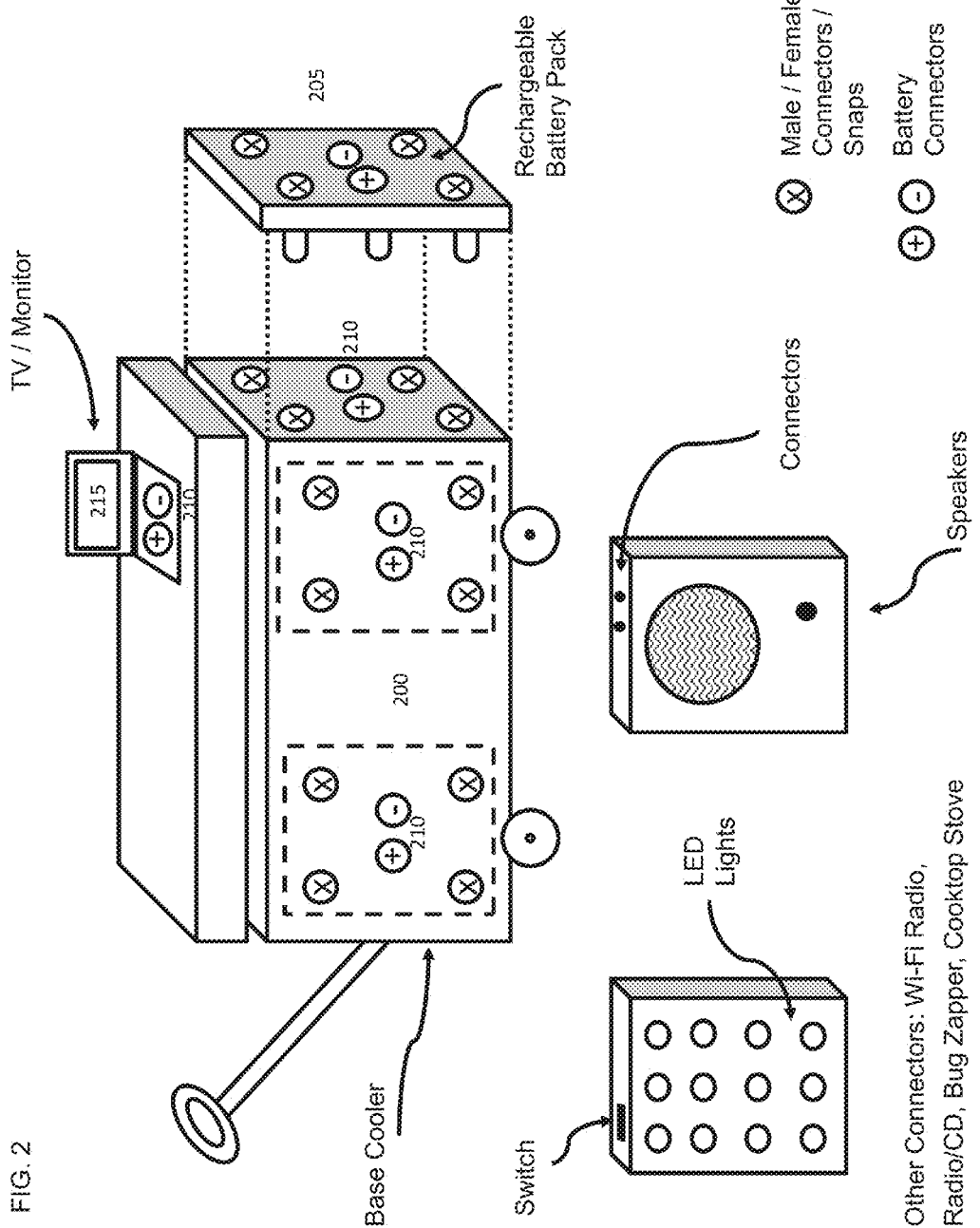
FIG. 2 illustrates a cooler with power supply and attached electronics for use during a tailgate party.

FIG. 2 illustrates a cooler 200 with power supply 205 and attached electronics 210 for use during a tailgate party. In particular, the power supply 205 and attached electronics 210 associated with the cooler 200 can facilitate use of electronic devices (e.g., radios, stove tops, bug zappers) without the use of an electrical outlet. In this way, the owner may use one or more electronic devices in many different locations where plugging into an electrical outlet may not be possible and relying on battery supplies for the electronic devices for a long period of time may not be ideal.

The cooler 200 of FIG. 2 includes a plurality of holes (dictated by 'x' in the figure) that interact with posts to affix various items to the cooler 200. One such item that may be attached to the cooler 200 is the battery supply 205. It should be noted that the battery supply 205 may be a rechargeable battery supply. In some embodiments, the cooler 200 may be capable of using two or more battery supplies 205. The multiple battery supplies 205 may be used simultaneously or one after another (i.e. after one battery supply is exhausted).

Even after being attached to the cooler, 200, the battery supply 205 may be removed. Removal of the battery supply 205 may be desired in order to replace an old battery supply with a new battery supply 205 (in the case that the battery supply 205 is non-rechargeable). The battery supply 205 may also be removed so that it can be recharged (via a recharge station or other methods known in the art).

The battery supply 205 may be used to provide power to one or more electronic devices associated with the cooler 200. The power is provided between the battery supply 205 and the one or more electronic devices that may be attached to or associated with the cooler via electronics 210 that provide electrical connections. For example, a TV or monitor 215 may be associated with available electronics 210 of the cooler 200. The electronics 210 allows the battery supply 205 to supply power to the TV or monitor 215.

Other electronic devices may also be associated with the cooler 200. For example, lights, radios, speakers, stoves and bug zappers may be individual electronic devices that can be attached to the cooler 200. These electronic devices may be attached to the cooler 200 via the male-female snap-based attachments described above. In some embodiments, the electronic devices can be affixed to the cooler 200 using other available methods (e.g., mechanical or adhesive).

When attached to the cooler 200, the electronic devices interact with the electronics 210 of the cooler 200 so that the battery supply 205 can provide the necessary power to operate the electronic device (e.g., lights, radios, speakers, stove). The use of the battery supply 205 can facilitate use of these electronic devices in places where plugging the electronic device into an electrical outlet is not available (e.g., parking lot). The battery supply 205 may also facilitate use of these electronic devices even when the internal power supply of the electronic devices has diminished.

Figure 3:
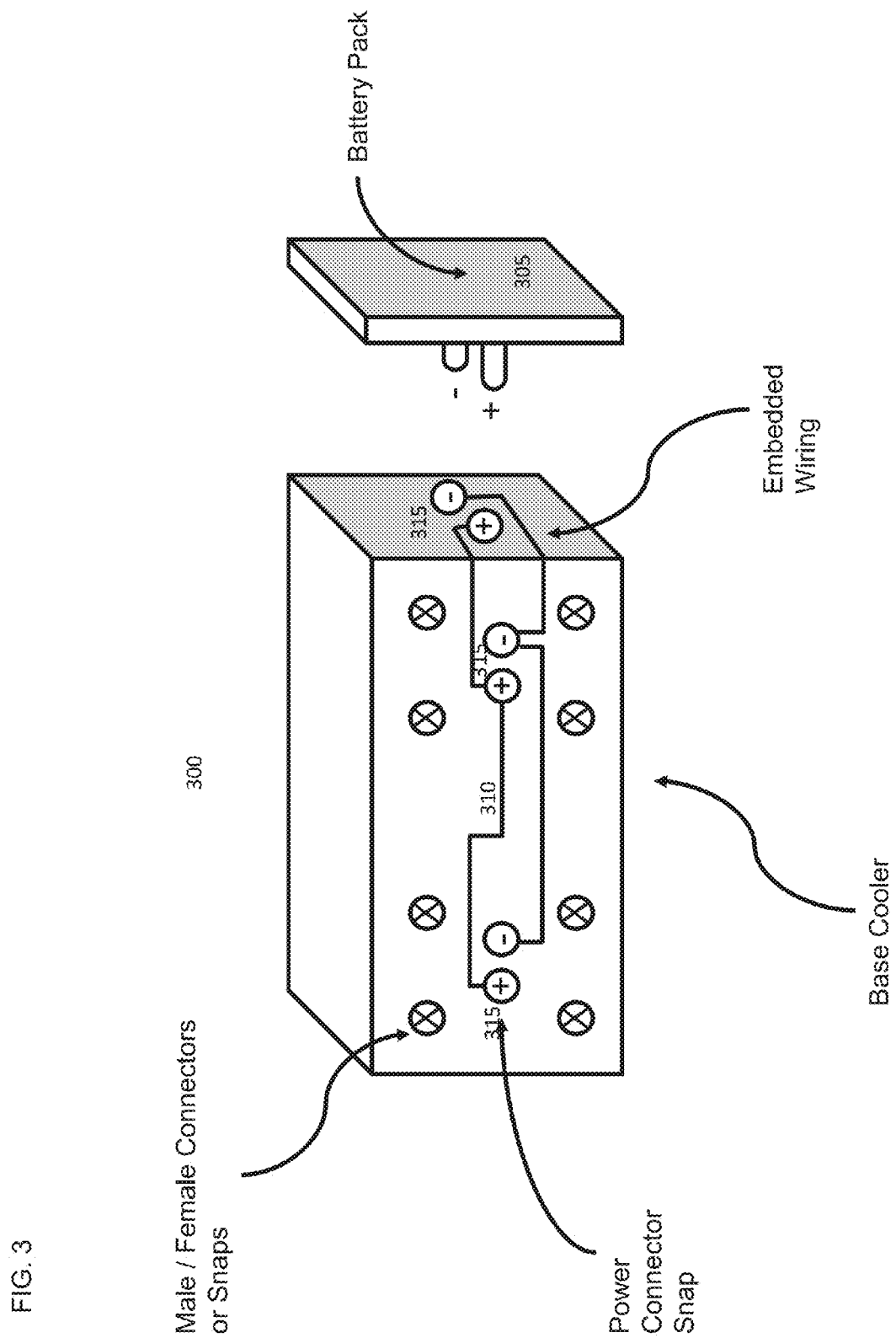
FIG. 3 illustrates detailed connections between the cooler and the power supply.

FIG. 3 illustrates detailed connections between the cooler 300 and the battery supply 305. As described above, the battery supply 305 may be a separate entity that can be attached to the cooler 300. The battery supply 305 may be attached to the cooler 300 using male-female snap-based attachments or any other method known (e.g., mechanical, adhesive) as described above.

With reference to FIG. 3, when the battery supply 305 is attached to the cooler 300, the power supplied from the battery supply 305 is transmitted via embedded wiring 310. The embedded wiring 310 runs from the electronics 315 (i.e. power connector snap) associated with the battery supply 305 to other electronics 315 that may be associated with electronic devices attached to or associated with the cooler 300 as described above in FIG. 2.

It should be noted that the embedded wiring 310 illustrated in FIG. 3 is an example of how power can be supplied to the electronics 315 or electronic devices. Other embodiments are possible for use with the cooler 300. For example, a single battery supply may be directly connected to a corresponding electronic 315 that the electronic device associated with the electronic 315 can use. In this way, each electronic 315 of the cooler 300 may have its own battery supply instead of sharing from one.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

Although the specification and figures may provide various embodiments directed to use of the technology herein a particular sport, it should be noted that the technology can be used in a variety of different events and venues including entertainment or cultural events presented at a theater, gymnasium, stadium or other facility involving a group of people. Such events may also include a variety of sporting events such as football (American and global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, or the opera, and the like; religious events; and more permanent exhibitions such as museums or historic homes.

What is claimed is:

1. A cooler for tailgating parties comprising:
   a plurality of attachment structures on outer surfaces of a cooler, wherein the attachment structures facilitate affixing one or more additional features to the cooler;
   one or more battery supplies, wherein the battery supplies are separate from the cooler and are affixed to the cooler via the plurality of attachment structures on the outer surfaces of the cooler;
   a plurality of embedded wiring in the cooler; and
   a plurality of electronics associated with the cooler, wherein the plurality of embedded wiring transmits power between the battery supply and corresponding electronics for the one or more additional features affixed to the cooler via the attachment structures.

2. The cooler of claim 1, wherein the plurality of attachment structures on the outer surfaces of the cooler include holes and corresponding posts such that the holes and posts form a snap-based connection.

3. The cooler of claim 1, wherein the plurality of attachment structures are found on the top and side surfaces of the cooler.

4. The cooler of claim 1, wherein additional features affixed to the cooler includes memorabilia.

5. The cooler of claim 1, wherein additional features affixed to the cooler includes decorations.

6. The cooler of claim 1, wherein additional features affixed to the cooler includes seats.

7. The cooler of claim 1, wherein additional features affixed to the cooler includes electronic devices.

8. The cooler of claim 7, wherein the electronic devices include radios, bug zappers, stovetops, lights, speakers and TV display/monitor.

9. The cooler of claim 1, wherein one or more of the battery supplies associated with the cooler is a rechargeable battery supply.

10. The cooler of claim 1, further comprising an expandable caboose that facilitates storing additional items that cannot be contained within the cooler, wherein the expandable caboose is attached to the cooler via one or more attachment structures.

11. The cooler of claim 1, wherein the plurality of attachment structures on the outer surfaces of the cooler include male-female attachments.

12. The cooler of claim 1, wherein the plurality of attachment structures on the outer surfaces of the cooler include mechanical attachments.

13. The cooler of claim 1, wherein the plurality of attachment structures on the outer surfaces of the cooler include adhesive attachments.

* * * * *